United States Patent Office 3,003,980
Patented Oct. 10, 1961

3,003,980
EPOXY BASE FRICTION MATERIAL AND METHOD OF MAKING SAME
William A. Hames, Dayton, and Burlin B. Brombaugh, Germantown, Ohio, assignors to General Motors Corporation, Detroit, Mich., a corporation of Delaware
No Drawing. Continuation of application Ser. No. 561,142, Jan. 24, 1956. This application July 25, 1958, Ser. No. 750,871
1 Claim. (Cl. 260—18)

This invention relates to friction material and is particularly concerned with a friction material including a thermosetting binder, which may be readily molded without the application of appreciable pressure or elevated temperatures. This constitutes a continuation of parent application S.N. 561,142 filed January 24, 1956, now abandoned.

In the conventional practice of making friction material such as brake elements, a suitable mixture of materials is intimately mixed with a thermosetting binder such as an uncured phenolformaldehyde resin to form a moldable compound. The compound is extruded or otherwise formed into slabs which are then cured under pressure on the order of 1500 p.s.i. and at temperatures in the vicinity of 300° F. Such high pressures are necessary to provide a brake lining material with a desired density, strength and resistance to wear, and to provide a friction material which may be handled and cut to desired shapes.

A brake element of the type above described is suitable for use as an automobile brake lining since the brake lining is secured to a brake shoe in the form of a cured slab and may be applied to the brake shoe under conditions of elevated temperature and pressure without damage to the brake shoe.

In the construction of machinery and apparatus of a relatively small size it is often necessary to provide relatively small friction elements on relatively delicate elements as for example, in connection with an automobile starter motor armature brake, washing machine clutches, etc. Friction material of the type above described may not be premolded and then bonded to these relatively delicate elements without damage thereto due to the elevated pressures and temperatures involved in such operations. Such friction elements could be molded separately, machined to shape and then secured to the machine elements which is obviously a relatively costly operation.

The object of this invention is to provide a friction material which may be readily molded to a desired shape without the application of appreciable external pressure and which may be cured at room temperature. The friction material may be molded to a desired shape directly on the element with which it is associated and securely bonded thereto without the application of elevated external pressure or heat in excess of room temperature.

Another object of the invention is to provide a friction material comprising an epoxy resin, asbestos, and other suitable components and having superior friction and molding properties.

Another object is to provide a friction material which may be applied with greater ease, with less equipment than is now used, and with no possible damage to sensitive adjacent elements by heat or pressure.

Further objects and advantages of the present invention will be apparent from the following description.

The friction material of the present invention is suitable for use in low to medium temperatures up to above 450° F. It is especially useful in applications wherein it is necessary to provide a friction surface on a machine element of a desired shape without the application of appreciable external pressures or high temperatures. Thus, the ability to apply the material in place without heat or pressure damage to sensitive adjacent components, without the necessity of utilizing cumbersome heat and pressure equipment which may be difficult or even impossible for certain applications, and without certain costly manufacturing steps which were previously necessary to the formation of friction elements.

The composition of the ingredients actually contains a large proportion of resin which constitutes the main body of the element, as compared to the prior method of utilizing a small proportion of such thermosetting resins as phenolformaldehyde merely to hold the other materials such as asbestos fiber and cashew nut shell oil in place. This composition enables one to apply the material to be cured in its place of use rather than requiring a preformed slab to be applied as such under heat and pressure as is well-known in the art. Furthermore, superior frictional properties result under most conditions probably due to the properties of the epoxy resin which is the chief constituent. A preferred composition wherein the ingredients thereof are intimately mixed to form a dough-like mass which may be readily molded or spread to a desired shape by means of a spatula or the like, is as follows:

| | Parts by weight |
|---|---|
| Epoxy resin | 100 |
| Short fiber asbestos | 8 |
| Cardolite | 8 |
| Triethylene tetramine (Accelerator) | 4 |

Cardolite is a well-known heat resisting friction fortifying powder obtained from the outer shell of the cashew nut and comprises a high molecular weight phenol oil having an unsaturated side chain. In preparing this substance, the oil extract from the cashew nut is cooked with formaldehyde to a desired degree and otherwise modified to secure desired properties. The resulting mass is then solidified and ground to a desired consistency. In the above composition, the Cardolite is ground to pass a 20 mesh per inch screen. However, for various applications the powder may vary in size so as to pass a 40 mesh screen.

The epoxy resin is a condensation polymer derived from the primary reaction of epichlorohydrin with bisphenol A. Other well-known reactants such as glycols or glycerols may be reacted with epichlorohydrin to form a usable epoxy resin. However, only low molecular weight epoxy resins may be utilized for the present invention. Other epoxy resins, those with higher molecular weights, no not seem to possess the necessary properties to give the superior results desired. The necessary low molecular weight resin may be represented by the following formula:

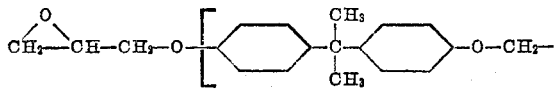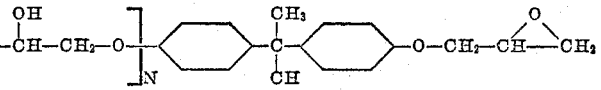

wherein N varies between zero and a small number less than 10. Preferably the epoxy resin used herein has an N value equivalent to approximately 0.2.

In the above recipe, the amount of the epoxy resin may be varied from about 90 to 110 parts, the asbestos from about 3.5 to 9.5 parts, and the Cardolite from about 3.5 to 9.5 parts. However, it is necessary to keep the constituents within approximately these limits, and the ratio of the accelerator to the epoxy resin must be kept at about 4 to 100 parts. Deviations from these proportions seem to give inferior results. Other amine accelerators such as metaphenylene diamine may be substituted for the triethylene tetramine in chemically equivalent amounts.

A second composition wherein the ingredients thereof are intimately mixed to form a flowable mixture which may be poured into a matrix or mold to fill the same is as follows:

| | Parts by weight |
|---|---|
| Epoxy resin | 100 |
| Asbestine (asbestos powder) | 8 |
| Cardolite | 4 |
| Triethylene tetramine (accelerator) | 4 |

In the above recipe the epoxy resin (as previously defined wherein N varies between 0 and 10) may be varied from 90 to 110 parts, the asbestine from 6.5 to 8.5 parts, and the Cardolite from 3.5 to 4.5 parts. Again, for the stated results, the ingredients should be kept approximately within the above limits, and the ratio of the accelerator to epoxy resin must be kept at about 4 to 100 parts.

In preparing friction elements, the dough-like mass of the first-mentioned recipe may be directly molded on a machine element, employing only a negligible amount of pressure to form the mass to the desired shape; which mass is then permitted to cure at room temperatures. Optionally, the temperature may be elevated slightly, for example, at 150° F., to hasten the curing if the heat is not harmful to the machine element involved, but this is actually unnecessary. The friction material is firmly bonded to the machine part in either case as a result of the curing process.

In applications wherein its is not practical or convenient to mold friction elements from a dough-like mass, the second-mentioned recipe may be used. This flowable material may be poured to fill out irregular shapes without any application of pressure. The resin may be cured at room temperatures or accelerated curing may be obtained at elevated temperatures if desired.

Laboratory tests using standard test procedures show that in applications involving temperatures not greater than about 450° F., the friction material of the present invention has frictional properties equivalent to or better than conventional friction materials using phenol-formaldehyde binders and made under conditions of elevated temperatures and pressures.

The friction material described may also be fabricated utilizing other equivalent well-known fillers, in place of asbestos or in combination therewith, for example, cellulosic materials such as cotton fabric and cotton linters, or leather scrap, mica, clays such as bentonite, metal powders, or various mixtures of these. Thus, a variety of applications may be covered as long as the relative proportions of epoxy resin, filler, Cardolite, and accelerator are kept within approximately the above-described limits.

While the embodiments of the present invention as herein described constitute preferred forms, it is to be understood that other forms might be adopted.

What is claimed is as follows:

A method of forming a friction material element which may be bonded to an associated machine element prone to damage at elevated bonding temperatures and external pressures comprising the steps of; creating a flowable mass by mixing 90 to 110 parts by weight of a low molecular weight epoxy resin having the formula

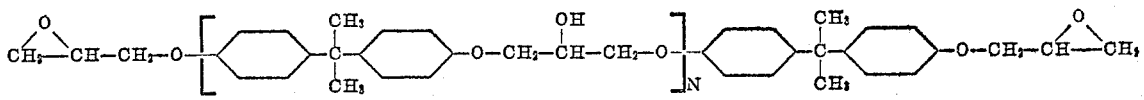

wherein N has a value between zero and 10, 3.5 to 9.5 parts by weight of a non-reactive filler, 3.5 to 9.5 parts by weight of polymerized cashew nut shell oil, and an accelerator taken from the group consisting of triethylenetetramine and metaphenylenediamine, said accelerator present in the ratio of the chemical equivalent of 4 parts by weight to each 100 parts of epoxy resin; applying and retaining said flowable mass at atmospheric pressure to the associated machine element in the desired shape at the place of application and allowing the mass to cure at room temperature to form the completed friction element and bond said friction element to the machine part.

References Cited in the file of this patent

UNITED STATES PATENTS

| 2,256,646 | Kuzmich et al. | Sept. 23, 1941 |
| 2,682,515 | Naps | June 29, 1954 |

OTHER REFERENCES

Dunn: Typical Application of Epoxy Resins, Rubber & Plastics Age, February 1954, pp. 84–87.